June 24, 1969 G. V. SHUTT 3,451,186
METHOD AND APPARATUS FOR PACKAGING SMALL
DISCRETE POLYGONAL OBJECTS
Filed Sept. 10, 1965 Sheet 1 of 2

INVENTOR.
GEORGE V. SHUTT
By Miketta, Glenny, Poms & Smith
ATTORNEYS.

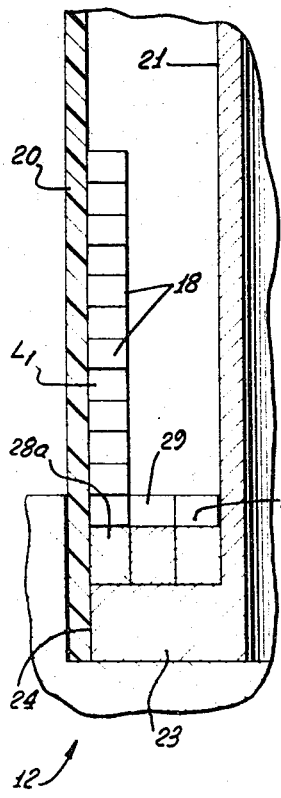
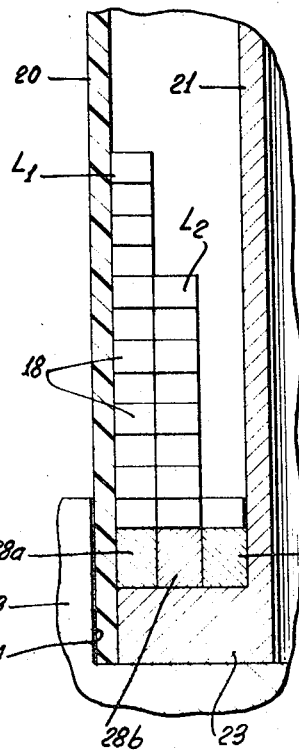
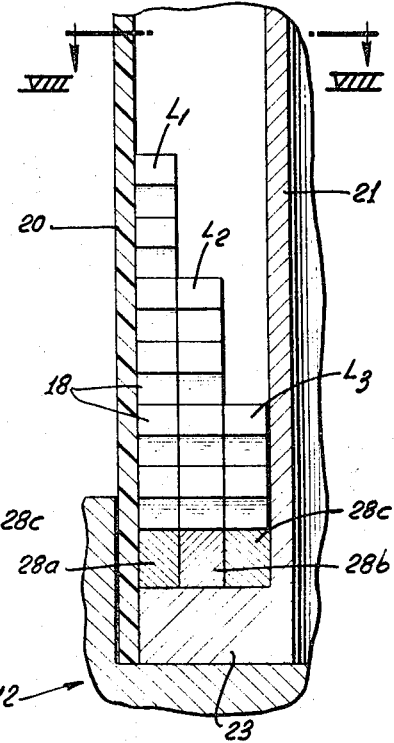
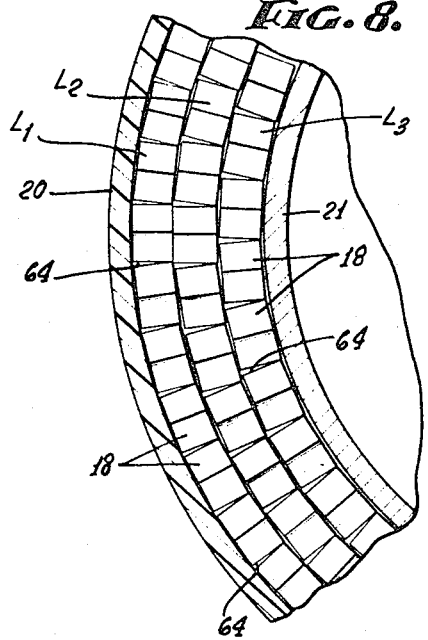
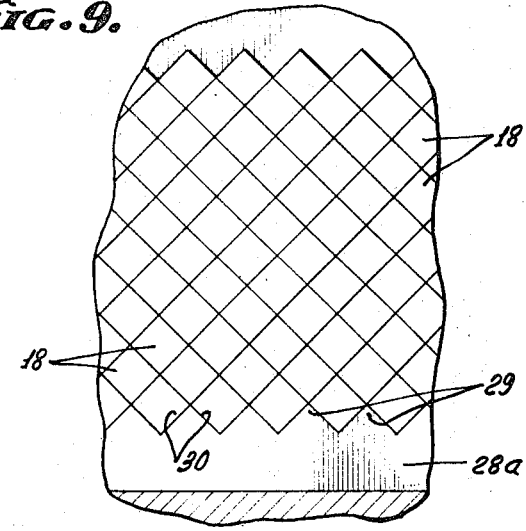

3,451,186
METHOD AND APPARATUS FOR PACKAGING SMALL DISCRETE POLYGONAL OBJECTS
George V. Shutt, Glendora, Calif., assignor to B. H. Hadley, Claremont, Calif.
Filed Sept. 10, 1965, Ser. No. 486,438
Int. Cl. B65b 63/02, 1/20, 13/20
U.S. Cl. 53—24  7 Claims

ABSTRACT OF THE DISCLOSURE

A method and apparatus for packaging and arranging small discrete polygonal objects in a container while imparting a vertical vibration to the container and unidirectionally spinning the container about a vertical axis while simultaneously depositing the small discrete polygonal objects into the container so that the objects are arranged in a plurality of vertically stacked concentric layers of discrete polygonal objects.

---

This invention relates to a method and apparatus for packaging and arranging small discrete polygonal objects, such as cubes having sides in the order of $5/32$ of an inch, in uniform courses and layers with a minimum of voids. The invention particularly relates to rapidly uniformly packaging such shrapnel elements in a container having an annular chamber, the elements being generally arranged in one or more concentric radial layers and in a diamond pattern.

Polygonal objects or shrapnel elements of relatively large cube size ($5/8$ of an inch per side) have been packaged by prior proposed methods and apparatuses in selected patterns in a container having an annular chamber by simultaneously oscillating and imparting vertical vibrations to the container (see Patent 3,027,694). In the method and apparatus of said patent, oscillations of the container were made through arcs of less than 180° with movement in one direction accentuated so as to cause the elements to move more positively in said one direction than in the opposite direction. However, when similar cubic elements (in the order of $5/32$ of an inch per side) are attempted to be stacked with such prior proposed method and apparatus, secondary vibratory effects produced by such oscillation prevented rapid formation of a desired pattern and instead often scattered the pattern. It is presently believed that the detrimental effect on such formation pattern by the oscillation through less than 180° and the vertical vibration was produced by the greatly increased number of cubes and number of rows of cubes because of the much smaller size shrapnel element. In addition the smaller size cube is usually of lighter weight than prior larger cubes and is somewhat more responsive to oscillatory and vibratory forces.

As a result of the increased number of the smaller size polygonal shrapnel elements more void between elements may be formed in the annular chamber. In the method of packaging of this invention, radial rows of cubes are easily uniformly formed by the centrifugal forces employed. Uniform weight distribution in the container may be closely achieved, the desired number of elements may be packaged in the container, and the distribution or dispersing of such elements when exploded will not be adversely affected by the presence of voids between elements in uniformly formed radial rows.

The primary object of this invention is to disclose and provide a method and apparatus of rapidly, effectively and reliably packaging relatively small polygonal shrapnel elements in the order of $5/32$ of an inch per side.

An object of the invention is to disclose and provide a novel method of forming such relatively small cubes in successive radial layers and courses by continuously spinning while vertically vibrating a container having an annular chamber into which such elements are fed.

Another object of the invention is to disclose and provide a novel method of selectively controlling the formation of layers of such polygonal elements in an annular chamber.

Another object of the invention is to disclose and provide a novel apparatus for producing vertical vibratory components which are imparted to such small elements while reducing to a minimum the transmission to the elements of secondary non-vertical vibratory components.

A further object of the invention is to disclose and provide a novel apparatus for packaging small shrapnel elements in a container wherein the container is assembled with the apparatus without a fixed, yieldable or solid connection between the apparatus and the container, that is, the container is supported in the apparatus by gravity.

A further object of the invention is to disclose and provide an apparatus wherein centrifugal force imparted to shrapnel elements fed into the chamber may be readily varied and be under the control of an operator so that selected layers and courses may be formed.

A general object of the invention is to disclose and provide a novel apparatus and method for rapidly, effectively packaging and stacking such relatively small polygonal shrapnel elements with a minimum of voids, with uniform stacking, and with a resultant uniform resistance to explosive forces and with a generally uniform shot distribution pattern.

Generally speaking, the method of the present invention contemplates dropping the shrapnel elements into an open end of a container which is supported in a relatively shallow recess, imparting a vertical vibration to the container through the workholder in which the shallow recess is provided, spinning said container about its vertical axis and simultaneously subjecting the container to virtually only vertical vibrations, varying the speed of rotation of said container to first form an outer peripheral radial layer of elements in a selected number of courses, and then reducing the speed of rotation of the container to form an adjacent inner concentric radial layer of polygonal elements in a selected number of courses lower than the top of the outer first formed layer, and then repeating the variations in speed until a plurality of concentric layers are formed in the chamber to a selected height.

It will be understood that other objects and advantages will be readily apparent from the following description of the drawings in which an exemplary embodiment of the present invention is shown.

In the drawings:

FIG. 5 is an enlarged fragmentary vertical sectional view taken in a radial plane showing formation of an outer layer of elements;

FIG. 6 is a sectional view in the same plane as FIG. 5 showing formation of an adjacent inner layer of elements;

FIG. 7 is a sectional view taken in the same plane as FIG. 5 and showing the formation of a third layer of polygonal elements;

FIG. 8 is a fragmentary sectional view taken in the plane indicated by line VIII—VIII of FIG. 7;

FIG. 9 is a sectional view taken in a curved surface generated by moving a vertical line parallel to and at a radius about the container axis.

Figure 1:
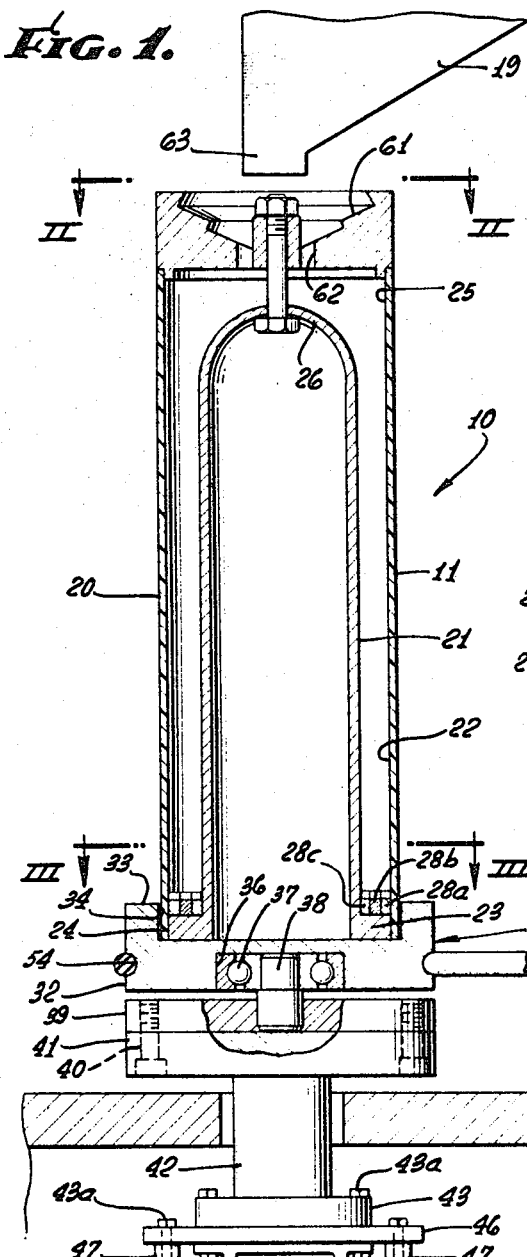
FIG. 1 is a sectional view of a device embodying this invention, the section being taken in a vertical plane bisecting the device.
Figure 2:
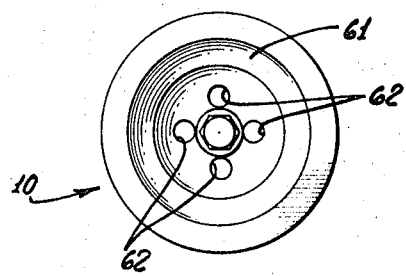
FIG. 2 is a horizontal sectional view taken in the plane indicated by line II—II of FIG. 1.

The apparatus or device generally indicated at 10 in FIG. 1 shows an exemplary embodiment of this invention. Device 10 may generally comprise a cylindrical container or receptacle 11 retained at its lower end in a workholder member 12. A vibrator means 14 connected with holder member 12 along a vertical axis produces vertical vibratory force components therein. Means for rotating workholder member 12 and container 11 about said vertical axis may comprise a variable speed motor 15 connected to workholder member 12 by belt 16 and controlled by a suitable rheostat means 17. Means for feeding polygonal elements 18 to container 11 may comprise a gravity feed chute 19 which may discharge elements 18 into the top open end of container 11. The elements then fall to the bottom of the container and are subjected to continuous centrifugal force and simultaneous vibratory forces to lay up said elements in one of the radial layers to form a desired pattern.

Container 11 may be similar in construction and shape as the container shown in Adler Patent 3,026,804, and may comprise an outer cylindrical wall 20 of suitable material usually metal but may include Plexiglas, Lucite, or other material which is rigid and dimensionally stable for specific purposes. An inner concentric wall 21 defines with outer wall 20 an annular chamber 22 adapted to be filled with polygonal elements 18 in accordance with a preselected pattern. Inner wall 21 may be made of any suitable material, usually of metal. A flange 23 on the bottom of inner wall 21 extends outwardly and is received within the lower end portion of outer wall 20 as at 24. At its top, outer wall 20 forms an opening 25 for the container and inner wall 21 has a closure plate 26. The diameter of the container 11 may be any suitable selected diameter and in this example may be a diameter of five inches. The radial width of chamber 22 may likewise be any suitable width which may receive only one layer of polygonal elements 18 or may be of sufficient width to receive, for example, from one to five radial layers of polygonal elements. In the present example, three layers of elements are shown and described to illustrate the invention.

Each polygonal element 18 may be a cube of metal in the order of 5/32 inch per side. Such elements 18 are relatively uniform in weight and dimension. Preferably, they may be made of cold rolled metal. Elements 18 may have their edges and corners slightly rounded as by tumbling in a drum-like receptacle in order to facilitate packaging of a plurality of said elements. Such elements 18 may be used as shrapnel elements for a warhead.

Figure 3:
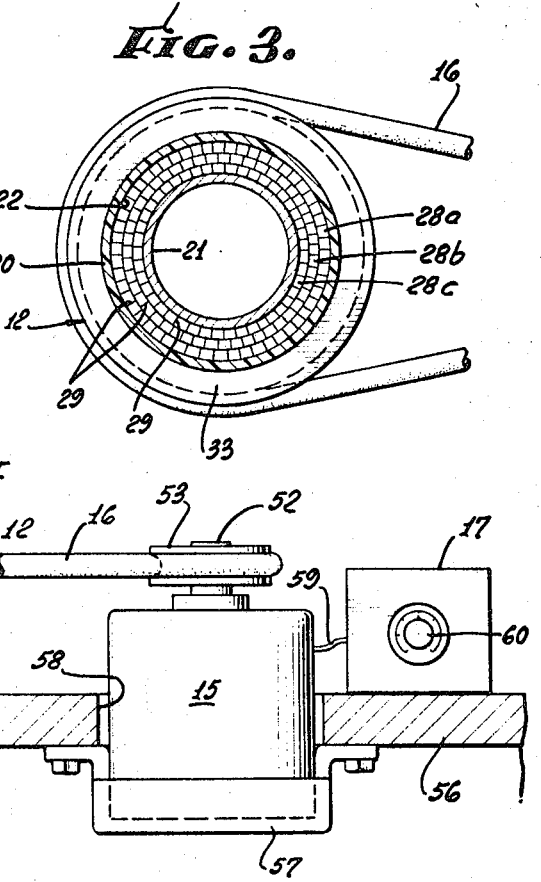
FIG. 3 is a horizontal sectional view taken in the plane indicated by line III—III of FIG. 1.
Figure 4:
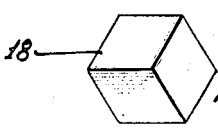
FIG. 4 is a perspective view of a polygonal element adapted to be packaged by the device of FIG. 1.

The lower end of container 11 may be provided with a plurality of concentric base rings 28a, 28b and 28c, each seated on flange 23 at the bottom of chamber 22. Outer ring 28a also bears against the inner adjacent surface of outer wall 20 and inner ring 28c bears against the adjacent portion of inner wall 21. The depth of chamber 22 is a multiple of the width of elements 18 and in this example the width of each ring 28a, 28b, and 28c is approximately that of a side of an element 18. The three base rings nest one within the other and provide on their upper surfaces a course forming pattern. As best seen in FIG. 9, ring 28a has a plurality of upwardly directed ridges 29 separated by valley spaces 30, the face of each tooth 29 being approximately the dimension of a side of the cube element 18. FIG 9 illustrates the diamond pattern which a plurality of cubes will produce when elements 18 are fed into the container and are disposed at the bottom of the chamber. Such a diamond pattern is disclosed in Patent 3,026,804. It will be noted from FIG. 3 that the base rings 28a, 28b and 28c are disposed at the bottom of chamber 22 in such a manner that the upwardly facing tooth ridges 29 may at some locations around the axis of the container be in alignment and in other locations may be offset from the ridge line of adjacent teeth because of the difference in radius of the several concentric rings. Therefore, the ridges and valleys of rings 28a, 28b, and 28c are not necessarily radially aligned.

Means for supporting container 11 comprises the workholder member 12 which may include a workholder plate 32 having a peripheral upstanding flange 33 forming a workholding cavity or recess 34. In an exemplary container of five inches in diameter, the depth of recess 34 may be approximately one inch. The bottom end of container 11 is only loosely fitted within recess 34, such clearance may range between .005 to .010 inch. The workholder plate 32 is rotatably mounted by ball bearing 37 received within a downwardly facing bearing cavity 36. A stub shaft 38 coaxial with bearing 37, member 12 and container 11, may be carried by a top plate 39. Plate 39 may be fixed by stud bolts 40 to a flange or head 41 carried on vibrating shaft 42.

Means to impart substantially only vertical vibratory force components to container 11 may comprise the shaft 42 attached to and driven by a suitable vibrating mechanism, generally illustrated in this example as a Syntron vibrator. This vibrator is briefly described in Patent 3,027,694 and may comprise a base 43 attached to vertical shaft 42 and secured by bolts 43a to a vibratory plate 46. Plate 46 may be supported for vibration by resilient sleeve mounts 47 which space plate 46 from frame member 45. Vibrations in a vertical and axial direction with respect to shaft 42 and in the order of 3600 vibrations per minute may be produced by an armature 48 and associated magnet 49. The mounting of armature 48 and magnet 49 is well known and is not described in detail (see Patent 3,027,694). The Syntron vibrator is of well known manufacture. Other devices capable of producing a vertical vibration in shaft 42 may also be used. The amplitude of vertical vibrations produced may be in the order of about .010 inch.

Means for rotating or spinning container 11 at selected speeds may comprise a variable speed motor 15 having a motor shaft 52 carrying a pulley 53 which is connected by belt 16 to workholder member 12. Belt 16 engages workholder member 12 in circumferential groove 54. Motor 15 may be supported from a table top 56 in opening 58 in suitable manner as by a depending bracket 57 and may be connected by lead 59 to a suitable rheostat 17. In this example, rheostat 17 is shown with a control knob 60 which may be selectively turned to vary the speed of motor 15. In some installations, control knob 60 may be eliminated and a foot control pedal connected with a rheostat used to vary the speed of the motor. Belt 16 spins workholder member 12 and container 11 in one direction about their vertical axes and bearing 37. A selected number of revolutions per minute for the present device may be about 200. Depending upon the diameter of container 11, the size and weight of elements 18, and the number of radial layers to be formed, the speed of rotation of container 11 may vary in order to provide the most effective stacking of elements 18.

Means for feeding elements 18 into container 11 may comprise a gravity feed chute 19 having a bottom discharge outlet 63 from which elements 18 may flow onto a shallow inverted stepped conical distributing surface 61. Surface 61 directs elements 18 toward a plurality of spaced ports or openings 62 adjacent the axis of the conical surface. Each opening 62 may be of circular shape of a diameter sufficiently greater than the maximum dimension of a single element 18 to permit free passage of elements 18 therethrough. Openings 62 may be diametrically disposed so that as elements drop through such openings there will be generally uniform distribution of elements within container 11. Such distribution is enhanced by a rounded or dome shaped top plate 26 and by the continuous spinning of the container.

In operation of device 10, shrapnel elements 18 fed through chute 19 drop onto the inclined distributing surface 61, drop through ports 62, and are prevented from being radially outwardly thrown by stepped surface 61. It will be apparent that ports 62, more or less than four, may be employed or that the elements may be fed to the chamber 22 in other suitable fashion so that uniform distribution will occur as they fall in chamber 22.

Elements 18 falling through ports 62 while the container 11 is being rotated in one direction at a generally constant speed will be imparted a certain amount of circulatory motion as they fall so that in appearance elements 18 fall toward the bottom of container 11 in a somewhat spiral path depending upon the speed of rotation of container 11. As the elements reach the bottom of container 11, and since the container 11 is being spun initially at a virtually maximum rate of, for example 200 r.p.m., the elements will form a first layer $L_1$ and course on annular ring 28a and be pressed against the inner surface of cylindrical wall 20. As elements 18 contact rings 28a, 28b, 28c, they are subjected to a vertical force component by the vibrating device 14. Such vibration causes each element 18 to seek out its position in a tooth cavity on ring 28a and to be held against wall 20. Since there is a flow of elements at four points about the circumference of the annular chamber 22, a first course and layer $L_1$ of elements 18 is rapidly formed (FIG. 5). As additional elements fall they will form a second course on top of the first course as long as the spinning speed is sufficient to urge them against wall 20.

In operation it is desirable that several courses in outer layer $L_1$ be formed or laid up against outer wall 20 before commencing build up of inner concentric layers and courses. In order to commence build up of an intermediate layer $L_2$ (FIG. 6) on the ring 28b, the speed of rotation of container 11 may be reduced as by operation of rheostat control knob 60. The reduction of spinning speed causes the elements 18 to fall radially inwardly of the outer partially formed layer $L_1$ and be subjected to vertical vibration to form a pattern similar to outer layer but in a second inward radial layer $L_2$. The spinning speed is manually controlled and varied as elements 18 fall into chamber 22 at a generally constant rate until the second radial layer $L_2$ reaches about one inch from the top of the outer radial layer $L_1$. Speed of spinning container 11 may again be reduced so as to cause build up of a third radial layer $L_3$ (FIG. 7) beginning with a first course on the ring 28c.

FIGS. 5, 6 and 7 illustrate generally the build up of layers $L_1$, $L_2$, and $L_3$. Variation in speed of rotation while container 11 is being vertically vibrated at a relatively constant rate of vibration, together with the smallness of shrapnel elements 18 and their rounded corners and edges, permit portions of layers $L_1$, $L_2$, $L_3$ to be successively formed virtually independent and separately of the other layers. Thus annular chamber 22 is filled in a novel manner whereby the outer radial layer $L_1$ is first formed with a selected number of courses, then later the intermediate layer $L_2$, and then later the radial innermost layer $L_3$, the tops of said layers $L_1$, $L_2$, $L_3$ as they are being formed being in stepped relationship and extending downwardly and inwardly from outer layer $L_1$. In some instances and at certain speeds, after staggered relationship of the rows is established, the elements 18 may fall into all radial layers simultaneously and will build courses simultaneously for an appreciable height. Varying rotation speed, as for example from 200 r.p.m. to 60 r.p.m. at regular intervals of 15 seconds, may also produce this result.

It will be apparent from a consideration of FIG. 8, that since elements 18 are cubes, voids 64 will appear between discrete elements 18 in a layer and between discrete elements in adjacent layers $L_1$, $L_2$, $L_3$.

After the three layers of shrapnel elements 18 have been completed and each reaches a desired height in the container 11 (approximately at the upper end of inner wall 21) the container 11 may be removed from workholder member 12 and by means of ports and apparatus not shown may be placed under vacuum in order to draw in a suitable bonding material such as a plastic resin or an epoxy as described in Patents 3,026,804 and 3,027,694. Under vacuum the bonding material completely fills voids 64 so that the three layers $L_1$, $L_2$, $L_3$ of shrapnel elements 18 are virtually uniformly bonded together. The container 11 with the shrapnel elements 18 so formed therein may then be associated with a warhead in desired manner.

It will be noted that in operation of the apparatus 10 the container 11 is seated within the recess 34 of workholder 12 and no other means are employed to hold container 11 in vertical upright position. Thus container 11 as it is being spun at a maximum rate of speed may tip slightly about its vertical axis as permitted by the clearance between outer wall 20 and flange 33. Such clearance may not exceed .010 inch and it will be apparent that such tipping is relatively small. However, it has been discovered that such limited restrained tipping of the container is desired and virtually unrestrained vertical axial movement avoids secondary lateral vibratory force components which might tend to disturb the formation of the layers. Vertical vibrations imparted to the workholder 12 through the vibratory shaft 42 occur essentially along the vertical axis of the container 11. Thus secondary components of force which might normally be associated with a vibrating reciprocating axial shaft are limited so as to be virtually negligible.

While the embodiment of the invention illustrates only three concentric layers of shrapnel elements more layers, such as five, may be made by the apparatus and method of this invention. When a fifth inner layer is being formed, spinning of the container is substantially reduced in order to permit the elements to fall and bounce into the innermost radial cavities.

In the practice of the method of this invention, the simultaneous vibrating of the gravity held container while spinning the container at selected, variable rates of speeds, provides an effective, rapid forming or build up of radial layers of cubic elements in the annular chamber 22. The vertical vibrations while spinning appear to radially outwardly direct each cubic element into a course with a minimum of movement within the chamber. By controlling and modifying the spin of rotation of the container, the build up of the concentric radial layers may be readily controlled. As a result, a plurality of concentric layers of cubic elements 18 may be rapidly arranged in annular chamber 22 with a minimum of voids.

The effect of spinning the container while vibrating it produces two important effects. First, radial layers of elements may be separately formed by varying and selecting certain speeds of rotation. Second, any lateral secondary force components of the vertical vibrator will tend to cancel and neutralize themselves in their effect upon elements 18 because of the continuous spinning of the container. Thus scattering of the pattern being formed is virtually eliminated by spinning.

Preferably the arrangement of relatively small cubic elements such as described above in chamber 22 is made in a diamond pattern as disclosed in Patent 3,026,804. It will be understood, however, that the particular geometric pattern configuration may be varied and modified without departing from the spirit of this invention.

It will be understood that all changes and modifications which come within the scope of the appended claims are embraced thereby.

I claim:
1. A method of arranging small discrete polygonal elements in the order of $5/32$ of an inch per side in a container having an annular chamber open at one end and having a course starting means closing the other end, comprising the steps of:

supporting the container in a vertical position with said other end limitedly held for limiting tilting of the container;
spinning the container in said vertical position at a selected rate of speed;
feeding said elements by gravity into the open end of the chamber during spinning;
simultaneously imparting a vertical vibration to the container while spinning the container and feeding said elements; and varying the rate of spinning speed whereby each course of elements is virtually completed before a succeeding course is started.

2. A method of arranging small discrete polygonal elements in a container having an annular chamber open at one end and having a closed other end, comprising the steps of:
supporting the container in a vertical position at said other end for limited tilting thereof;
imparting a spinning motion to said container at said other end and in said vertical position;
dropping said polygonal elements into the open end of the chamber during spinning;
imparting a vertical vibration to the container during spinning and feeding;
and varying the speed of spinning whereby radial layers of elements are progressively formed in said chamber.

3. A method of arranging small cubic elements in an annular chamber in a container, said chamber having an open top, said container being disposed about a vertical axis, comprising the steps of:
feeding said elements into the open top of the container;
simultaneously rapidly spinning the container in one direction only during feeding;
simultaneously vibrating the container in the direction of the vertical axis while spinning;
and varying the speed of spinning whereby radial layers of elements are progressively formed in said chamber.

4. A method of stacking cubic objects into a container, comprising:
dropping the objects into the container;
rapidly continuously spinning the container in one direction only about a vertical axis;
varying the speed of spinning whereby radial layers of elements are progressively formed in said container;
and imparting a vertical vibration to the container while spinning.

5. In an apparatus for stacking discrete polygonal objects in an annular chamber in a container in concentric layers and courses, comprising, the combination of:
holding means for said container;
means connected with said holding means for spinning said container and holding means about an axis and laterally disposed with respect to said axis;
a nonrotatable stub shaft antifrictionally connected with said holding means and disposed in the planar zone of said spinning means;
and means for imparting vertical vibrations to said stub shaft and to said container.

6. A method of arranging small discrete polygonal elements in a container having an annular chamber open at one end and having a closed other end, comprising the steps of:
supporting the container with its axis vertical;
feeding polygonal elements into the open end of the chamber;
imparting vertical vibrations to the container;
rotating said container about its vertical axis while elements are fed to said chamber and while said container is subject to virtually only vertical vibration; and
varying the speed of rotation of said container in order to first form an outer peripheral layer of elements to a selected height, and then reducing the speed of rotation as polygonal elements are fed into said container for forming an adjacent inner concentric radial layer of polygonal elements until the last mentioned layer reaches a selected height in relation to the outer concentric layer.

7. An apparatus for packaging small discrete cubic elements in a container having an annular chamber open at one end and having a closed other end, comprising the combination of:
a workholder member provided with a recess for receiving and holding one end of said container with the axis of the container vertical;
means for feeding and distributing cubic elements into the open end of the chamber;
means for supporting the workholder member for rotation about the vertical axis of said container, said support means including a shaft having a plate thereon and stub shaft;
bearing means for connecting said stub shaft and said workholder member;
means for imparting vertical vibrations to said shaft;
means for rotating said container and workholder member, including a pulley belt engaged with said workholder member and a variable speed motor; and
means for controlling and varying the speed of rotation of said container whereby cubic elements falling into said chamber are imparted both vertical and centrifugal motion components for causing said cubic elements to arrange themselves in successive, radial layers and courses in said chamber.

References Cited

UNITED STATES PATENTS

| | | | |
|---|---|---|---|
| 2,775,268 | 12/1956 | Eckart | 53—126 X |
| 3,026,804 | 3/1962 | Adler | 53—26 X |
| 3,027,694 | 4/1962 | Adler | 53—24 |

TRAVIS S. McGEHEE, *Primary Examiner.*

U.S. Cl. X.R.

53—126; 86—1